United States Patent
Figueroa et al.

(10) Patent No.: US 10,528,431 B2
(45) Date of Patent: Jan. 7, 2020

(54) PROVIDING INTEGRITY FOR DATA SETS BACKED-UP FROM CLIENT SYSTEMS TO OBJECTS IN A NETWORK STORAGE

(71) Applicant: INTERNATIONAL BUSINESS MACHINES CORPORATION, Armonk, NY (US)

(72) Inventors: Ernesto E. Figueroa, Sahuarita, AZ (US); Robert S. Gensler, Jr., Beavercreek, OH (US); Jeffrey R. Suarez, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 511 days.

(21) Appl. No.: 15/015,598

(22) Filed: Feb. 4, 2016

(65) Prior Publication Data
US 2017/0228293 A1    Aug. 10, 2017

(51) Int. Cl.
*G06F 11/14* (2006.01)
*G06F 16/11* (2019.01)
*G06F 16/23* (2019.01)
*H04L 29/08* (2006.01)

(52) U.S. Cl.
CPC ........ *G06F 11/1464* (2013.01); *G06F 16/113* (2019.01); *G06F 16/2365* (2019.01); *H04L 67/1097* (2013.01); *G06F 2201/84* (2013.01)

(58) Field of Classification Search
CPC ........... G06F 17/30569; G06F 17/3089; G06F 6/182; G06F 16/113; G06F 16/2365; G06F 3/067; G06F 3/065; G06F 11/1446; G06F 11/1448; G06F 11/1464; G06F 2201/84; H04L 67/1097

USPC ......................................... 707/661, 649, 667
See application file for complete search history.

(56) References Cited

U.S. PATENT DOCUMENTS

| | | | |
|---|---|---|---|
| 6,415,300 B1* | 7/2002 | Liu ..................... | G06F 11/1458 707/652 |
| 7,536,424 B2 | 5/2009 | Barzilai et al. | |
| 8,131,924 B1* | 3/2012 | Frandzel ............... | G06F 3/0608 711/111 |

(Continued)

OTHER PUBLICATIONS

Weigold, "GPFS Cloud ILM Storage Research Technology Outlook", IBM Corporation, Zurich, 2014, pp. 13.

(Continued)

*Primary Examiner* — Dennis Truong
(74) *Attorney, Agent, or Firm* — David W. Victor; Konrad Raynes Davda & Victor LLP (57) ABSTRACT

Provided are a computer program product, system, and method for providing integrity for data sets backed-up from client systems to objects in a network storage. Data set objects include data sets at a client storage and an inventory object has information on each of the data set objects, which are part of a backup object group to backup to the network storage. The data set and inventory objects in the backup object group are transferred to the network storage to store. The inventory object from the network storage is retrieved to select at least one of the data set objects in the network storage, which is requested. Notification is received that the backup object group has a data integrity error in response to one of the requested data set objects not located in the network storage.

24 Claims, 8 Drawing Sheets

(56) References Cited

U.S. PATENT DOCUMENTS

| | | | | |
|---|---|---|---|---|
| 9,021,448 B1* | 4/2015 | Gagliardi | ............... | G06F 8/70 717/128 |
| 2003/0033349 A1* | 2/2003 | Lambert | ............... | G06F 9/546 709/201 |
| 2003/0126201 A1* | 7/2003 | Hoang | ............... | G06F 3/0601 709/203 |
| 2003/0182301 A1* | 9/2003 | Patterson | ............ | G06F 11/1458 |
| 2004/0236841 A1* | 11/2004 | Matze | ............... | G06F 3/0622 709/212 |
| 2006/0184764 A1* | 8/2006 | Osaki | ............... | G06F 21/64 711/216 |
| 2010/0077160 A1* | 3/2010 | Liu | ............... | G06F 3/0482 711/162 |
| 2012/0303895 A1* | 11/2012 | Benhase | ............ | G06F 12/0868 711/118 |
| 2014/0201152 A1* | 7/2014 | Kumarasamy | ...... | G06F 11/1469 707/647 |
| 2014/0279912 A1* | 9/2014 | Anglin | ............... | G06F 11/1448 707/640 |
| 2015/0220747 A1 | 8/2015 | Young | | |
| 2016/0182328 A1* | 6/2016 | Bhasin | ............... | H04L 43/067 709/224 |

OTHER PUBLICATIONS

"DFSMSdss Storage Administration", IBM Corporation, Version 2 Release 1 of z/OS (5650-ZOS), Doc. No. SC23-6868-01, copyright 1984 and 2014, pp. 710.

* cited by examiner

PROVIDING INTEGRITY FOR DATA SETS BACKED-UP FROM CLIENT SYSTEMS TO OBJECTS IN A NETWORK STORAGE

BACKGROUND OF THE INVENTION

1. Field of the Invention

The present invention relates to a computer program product, system, and method for providing integrity for data sets backed-up from client systems to objects in a network storage.

2. Description of the Related Art

Data in logical volumes in a storage system may be backed-up and archived in an archival storage, such as a tape storage, using a DUMP command, in which a volume or selected data sets are sequentially written to tape. A backup program may then issue a RESTORE operation to retrieve the backed-up data sets to restore to a system. When a backup is written to a tape medium, the backup consists of a single sequential file that can be protected from modification.

SUMMARY

Provided are a computer program product, system, and method for providing integrity for data sets backed-up from client systems to objects in a network storage. Data set objects including data sets at a client storage are generated. An inventory object is generated having information on each of the data set objects, wherein the data set objects and the inventory object are part of a backup object group to backup to the network storage. The data set and inventory objects in the backup object group are transferred to the network storage to store. The inventory object from the network storage is retrieved to select at least one of the data set objects in the network storage. At least one of the data set objects indicated in the retrieved inventory object is requested. Notification is received that the backup object group has a data integrity error in response to at least one of the requested data set objects subject not located in the network storage.

Further provided are a computer program product, system, and method to backup data sets in a network storage that are received from a plurality of client systems over a network. Data set objects and inventory objects are received from the plurality of client systems over the network. Each inventory object has information on each of the data set objects in a backup object group. The received data set objects are stored in the network storage and the stored objects are indicated in an object inventory. A request is received or a requested data set object comprising one of the data set objects from one of the client systems. A determination is made from the object inventory as to whether the requested data set object is indicated in the inventory object for the backup object group is stored in the network storage. A data integrity error is generated for the backup object group including the requested data set object in response to determining that the requested data set object is not located in the network storage. A message is returned with indication of the data integrity error to the client system requesting the data set object.

DETAILED DESCRIPTION

Described embodiments provide techniques for a client system to store a data set as objects in a network storage. Since a single data set may be stored as one or more objects, an inventory object having information on the specific objects that make up the data set backup is also stored as part of the backup.

Described embodiments provide for the use of a logical data set DUMP operation that creates a set of objects to backup to reside in a network storage, such as a cloud storage. A logical RESTORE operation may be used to retrieve the data set objects that reside in the network (cloud) storage. Because objects in the network storage may be removed or changed, described embodiments provide an inventory object having information on the data set objects stored in the network storage that has information used to validate the restored data set objects to ensure they have not changed since they were backed-up in the network (cloud) storage. With the described embodiments, the data set objects in the network storage may be validated before they are restored to the client system. In this way, the data set objects stored in the network storage may have their integrity validated.

Figure 1:
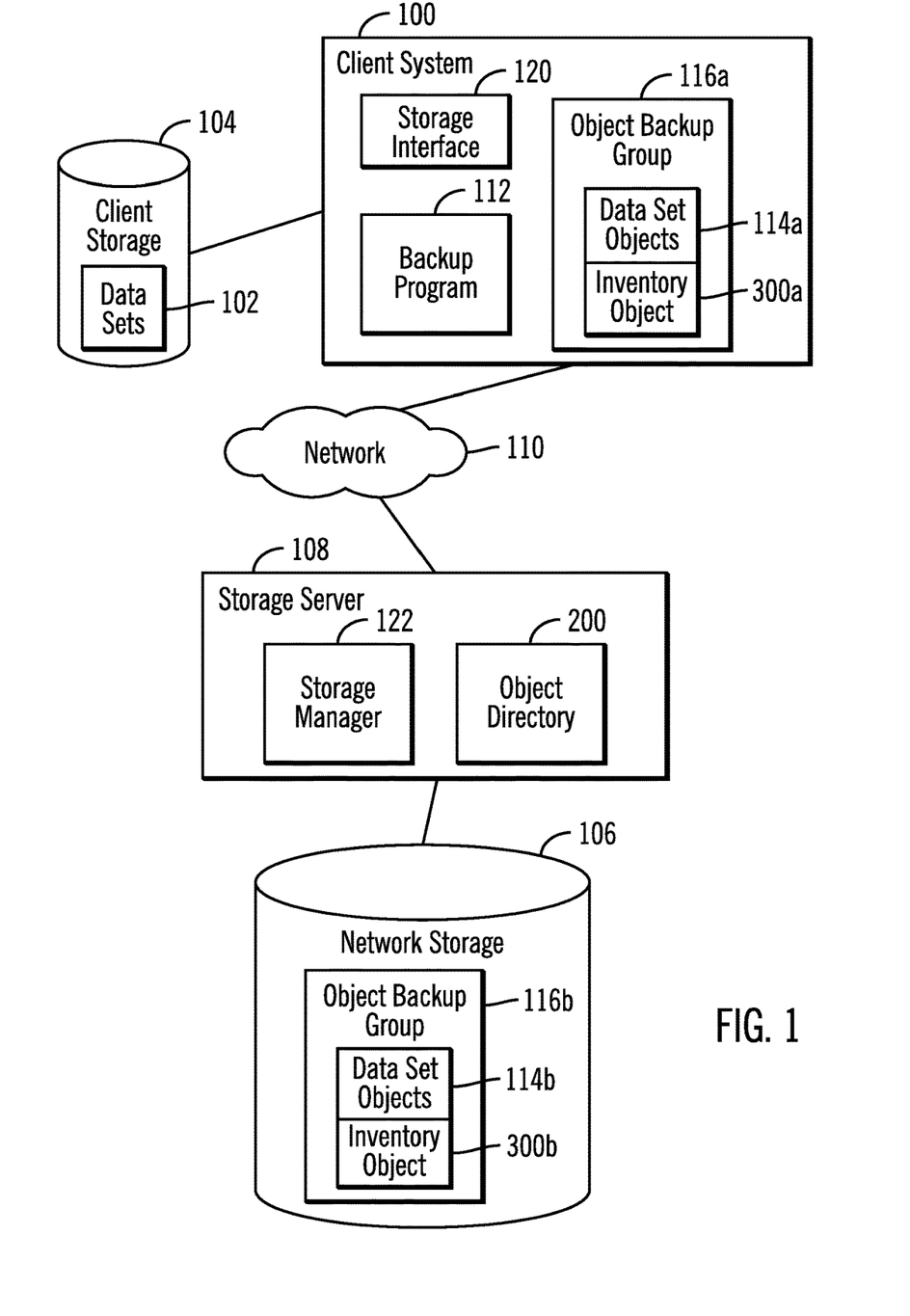
FIG. 1 illustrates an embodiment of a network storage environment.

FIG. 1 illustrates an embodiment of a network storage environment comprising a client 100, also referred to as a client system, that may backup data sets 102 in a client storage 104 in a network storage 106 managed by a storage server 108 over a network 110. In one embodiment, the storage server 108 may implement a cloud storage service to provide storage services to back up data sets 102 from multiple clients 100 over the network 110 that subscribe to the storage services offered by the storage server 108.

The client 100 may include a backup program 112 that packages all or portions of one or more data sets 102 into one or more data set objects 114a in an object backup group 116a. The backup program 112 may generate an inventory object 300a having information on the data set objects 114a in the group 116a. The client 100 may further include a storage interface 120 that is invoked to transmit the objects 114a, 300a in the group 116a to a storage manager 116 in the storage server 108 that stores instances of the received objects 114b, 300b in the network storage 106 as an object backup group 116b comprising an instance of the stored copy of the objects 114a, 300a.

The storage server 108 includes a storage manager 122 to process requests to store and return objects in object backup groups 116b from different client system 100. The storage manager 122 maintains an object directory 200 having information on the objects 114b, 300b stored in the network storage 106.

The backup program 112 may generate a separate inventory object 300a for each individual object or group of data set objects 114a being transferred as a group of consecutive data set objects. Further, the network storage 106 may store data set objects 114b and their inventory objects 300b from one or more client systems 100.

In one embodiment, the backup program 112 creates the objects 114a, 300a to store in the network storage 106 by issuing a DUMP command to backup selected data sets 102 or an entire volume by creating data set objects 114a including the data sets 102 to backup and the inventory object 300a having information on the data set objects 114a. The data set objects 114a may further include metadata corresponding to volume and data set characteristics for the data sets 102 to backup. The backup program 112 may further issue a RESTORE command to retrieve the data set objects 114b having the backed-up data sets 102 to restore at the client storage 104. The RESTORE command may restore individual partitions or data sets 102 that were part of a full volume dump or that were from a data set level dump.

In one embodiment, the storage interface 120 may use PUT commands to transmit the objects 114a, 300a to the storage server 108 and GET commands to retrieve objects 114b, 300b for an object backup group 116b in the network storage 106. In one embodiment, the PUT and GET commands may be part of a network protocol, such as the Hypertext Transport Protocol (HTTP). Further, the transmitting of the blocks from the client system 100 to the storage server 108 with the PUT and GET commands may be transferred using a block level storage transfer.

The client storage 104 and the network storage 106 may be comprised of one or more storage devices known in the art, such as interconnected storage devices, where the storage devices may comprise hard disk drives, solid state storage device (SSD) comprised of solid state electronics, EEPROM (Electrically Erasable Programmable Read-Only Memory), flash memory, flash disk, Random Access Memory (RAM) drive, storage-class memory (SCM), etc., Phase Change Memory (PCM), resistive random access memory (RRAM), spin transfer torque memory (STM-RAM), conductive bridging RAM (CBRAM), magnetic hard disk drive, optical disk, tape, etc. The storage devices in one storage tier maybe organized as a Redundant Array of Independent Disks (RAID) array, a Just of Bunch of Disks (JBOD) array, and other arrangements.

The network 110 may comprise a network such as a Storage Area Network (SAN), Local Area Network (LAN), Intranet, the Internet, Wide Area Network (WAN), peer-to-peer network, wireless network, arbitrated loop network, etc. In one embodiment, the storage server 108 may implement a cloud computing environment in the network 110 that provides storage services to clients 100 that subscribe to the cloud storage service.

Although a certain number of instances of elements, such as clients 100, storage servers 108, and storages 104 and 106, etc., are shown, there may be any number of these elements.

Figure 2:
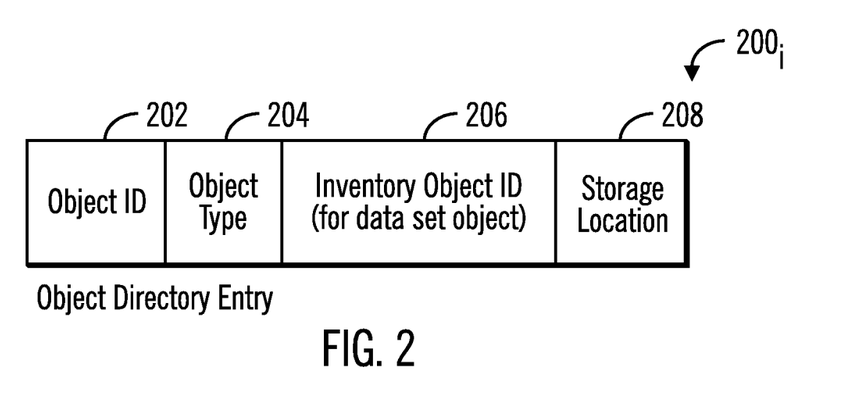
FIG. 2 illustrates an embodiment of an object directory entry.

FIG. 2 illustrates an embodiment of an object directory entry $200_i$ in the object directory 200 maintained by the storage manager 122, including an object identifier (ID) 202 providing a unique identifier of the object; an object type 204, such as a data set or inventory object; an inventory object ID 206 including the object 202 if the object type 204 is a data set object; and a storage location 208 in the network storage 106 of the object 202.

Figure 3:
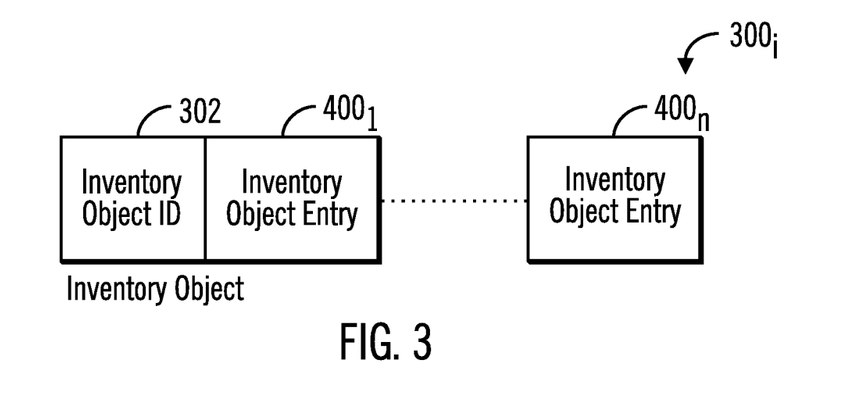
FIG. 3 illustrates an embodiment of an inventory object.

FIG. 3 illustrates an embodiment of an inventory object $300_i$, such as inventory objects 300a and 300b shown in FIG. 1, and includes an inventory object identifier (ID) 302 and one or more inventory object entries $400_1 \ldots 400_n$ for each of the data set objects catalogued in the inventory object $300_i$.

Figure 4:
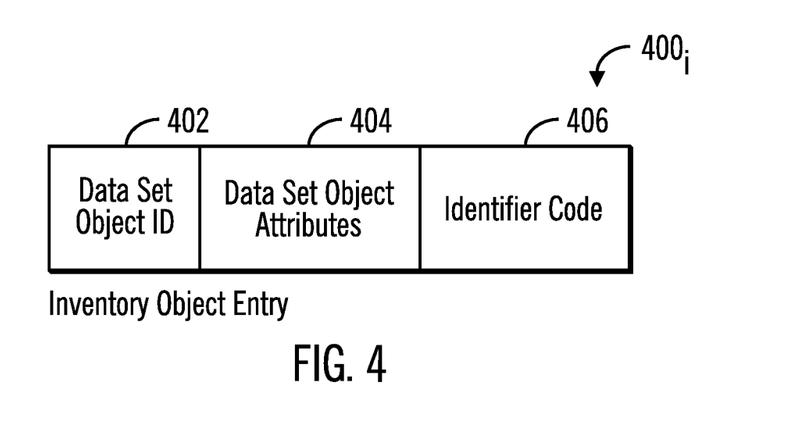
FIG. 4 illustrates an embodiment of an inventory object entry.

FIG. 4 illustrates an embodiment of an inventory object entry $400_i$ for an entry in the inventory object $300_i$ for a data set object, and may include a data set object identifier 402; data set object attributes 404, such as a time, application, client, etc.; and an identifier code 406, such as a fingerprint, hash code, checksum, etc., calculated from the data in the object 402 that may be used to uniquely identify the original data in the data set object 114a. The identifier code 406 may be used verify that the data set object 114b stored in the network storage 106 comprises the same object that was originally backed-up in the network storage 106, to determine whether the object has changed. The identifier code 406 may be calculated using a fingerprinting, hash or other algorithm applied to the data in the data set object 114a.

In one embodiment, the inventory objects $300_i$ may be read only to ensure the data integrity of the data set objects 114b written to the network storage 106. This may be useful for data set archive situations where the objects are not supposed to be updated, but may be updated and deleted in the network storage 106.

Figure 5:
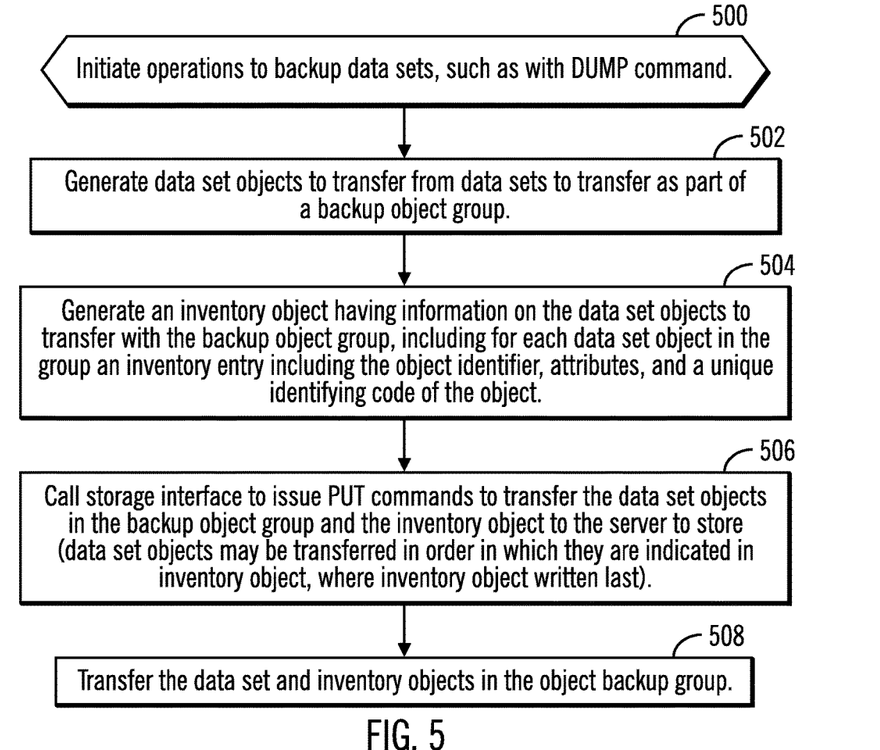
FIG. 5 illustrates an embodiment of operations to backup objects from a client system at a network storage.

FIG. 5 illustrates an embodiment of operations performed by the backup program 112 and storage interface 120 to backup one or more, or a portion of data sets 102. Upon initiating (at block 500) backup operations, which may be initiated with respect to a DUMP command that specifies to backup an entire volume of data sets 102 or specific data sets 102, the backup program 112 generates (at block 502) data set objects 114a to transfer as part of an object backup group 116a of objects. The backup program 112 also generates (at block 504) an inventory object 300a having an entry $400_i$ for each data set object 114a to transfer with the backup object group 116a, including for each data set object 114a in the group 116a, an object ID 402, object attributes 404, and identifier code 406.

The backup program 112 may then call (at bock 506) the storage interface 120 to issue PUT commands to transfer the objects 114a, 300a in the backup object group 116a to the storage server 108 to store in the network storage 106. Data set objects 114a may be transferred (at bock 508) in an order in which they are indicated in the inventory object 300a, and the inventory object 300a may be transferred or written last so objects 114a, 116a are written in a sequential manner even though the network storage 106 may not be comprised of a sequential access storage device, such as a tape drive.

Figure 6:
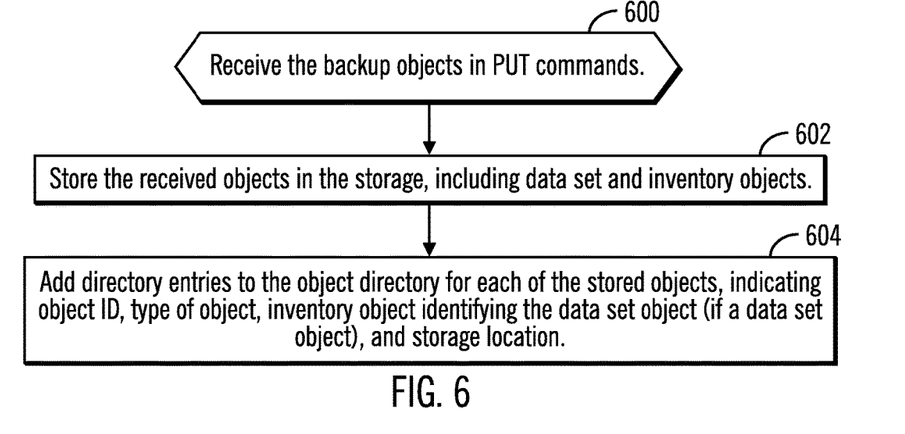
FIG. 6 illustrates an embodiment of operations to store backed-up objects from client systems in the network storage.

FIG. 6 illustrates an embodiment of operations performed by the server storage manager 122 to backup objects received from one of the client systems 100, which may be received as part of a cloud storage service implemented at the storage server 108. Upon receiving (at bock 600) backup objects in PUT commands from the storage interface 120, the storage manager 122 stores (at bock 602) the received data set 114a and inventory 300a objects in the network storage 106 to store or archive the object backup group 116a. The storage manager 122 adds (at bock 604) directory entries $200_i$ to the object directory 200 for each of the stored objects 114a, 300a, indicating object ID 202, object type 204, inventory object ID 206 of inventory object 300b including the data set object (if a data set object), and storage location 208 in the network storage 106 at which the object 202 is stored.

Figure 7:
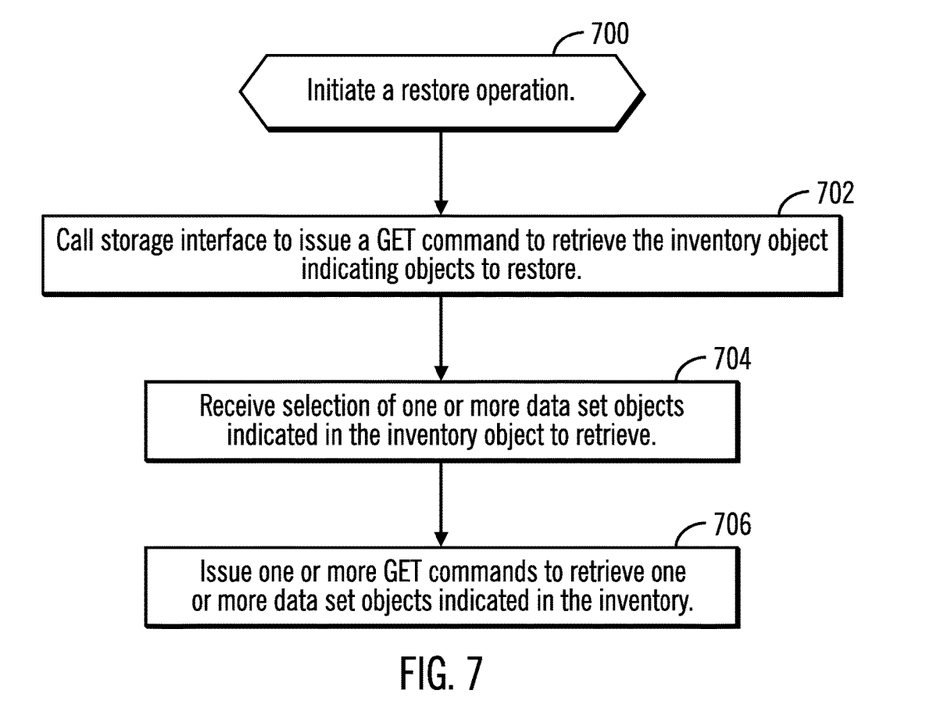
FIG. 7 illustrates an embodiment of operations for a client system to initiate a restore of a data set object stored in the network storage.

FIG. 7 illustrates an embodiment of operations performed by the backup program 112 and storage interface 120 to restore data sets from the object backup group 116b. The backup program 112 may initiate (at block 700) a restore operation which calls (at block 702) the storage interface 120 to issue a GET command to retrieve one or more inventory objects 300b indicating data set objects 114b to restore. Upon the backup program 112 receiving (at block 704) selection of one or more of data set objects indicated in the retrieved inventory object 114b, the storage interface 120 issues (at block 706) one or more GET commands to retrieve one or more data set objects 114b indicated in the inventory 706. In one embodiment, the backup program 112 may issue a RESTORE command to restore a volume or selected data set objects 114b indicated in the retrieved inventory object 300b, which then results in the call to the storage interface 120 to GET the selected data sets, either in a selected volume or specific selected data sets, from the network storage 106.

Figure 8:
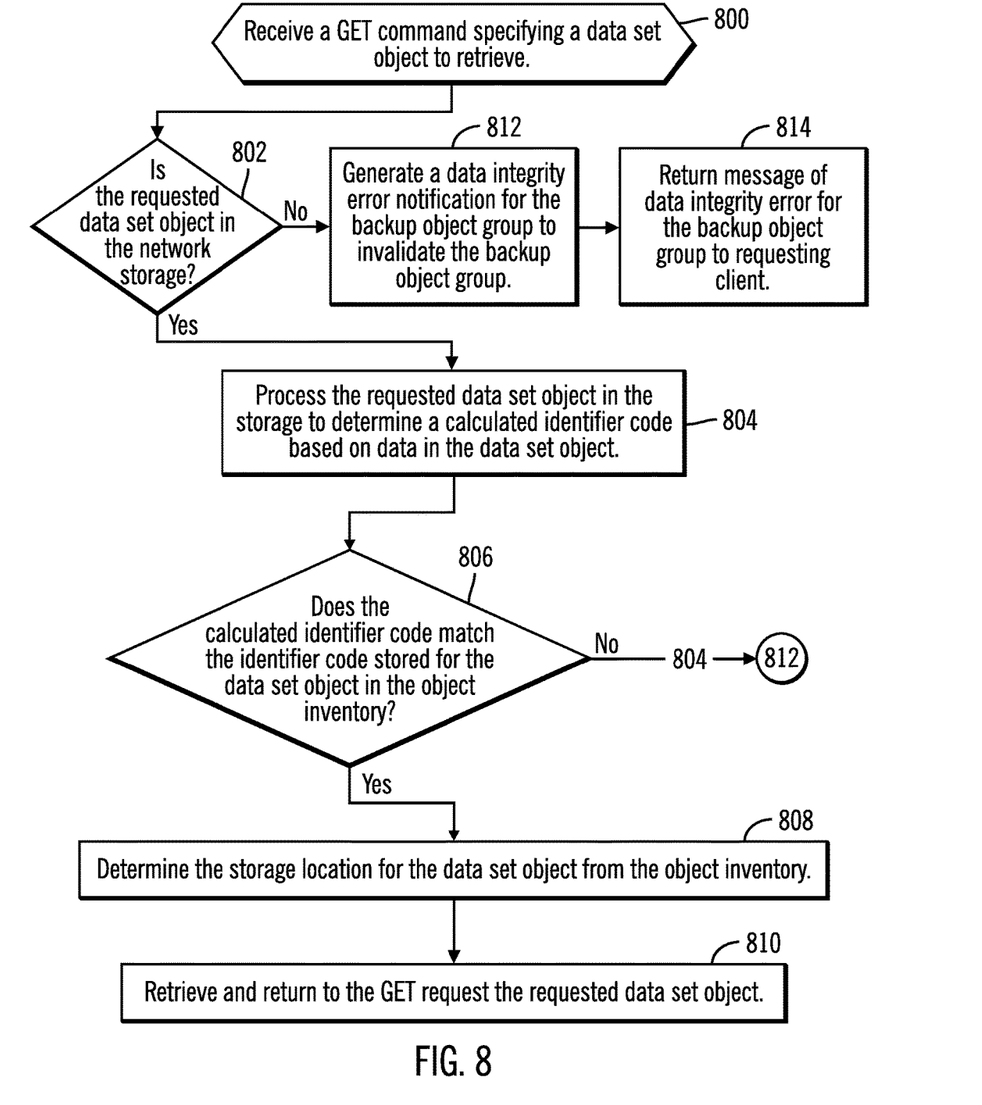
FIG. 8 illustrates an embodiment of operations to return restored data sets from the network storage to a requesting client system.

FIG. 8 illustrates an embodiment of operations performed by the server storage manager 122 to respond to a request for data set objects from the client systems 100. Upon receiving (at block 800) a GET command specifying a data set object 114b to retrieve, the storage manager 122 determines (at block 802) whether the requested data set object 114b selected from the object inventory 300b is located in the network storage 106. If so, then the storage manager 122 processes (at block 804) the requested data set object 114b in the network storage 106 to determine a calculated identifier code based on the data in the requested data set object 114b, such as a fingerprint calculation, hash algorithm, etc. If (at block 807) the calculated identifier code matches the identifier code 406 for the requested data set object indicated in the inventory object $300_i$, then the storage manager 122 determines (at block 808) the storage location 208 for the data set object directory entry $200_i$ in the object directory 200 and then returns (at block 810) the requested data set object to the GET request to the requesting client system 100.

If (at block 802) the requested data set object is not in the network storage 106 or if (at block 806) the calculated identifier code does not match the identifier code 406 for the requested data set object, indicating it has changed since it was backed-up in the network storage 106, then the storage manager 122 generates (at block 812) a data integrity error notification for the backup object group 116b and returns (at block 814) a message of the data integrity error for the backup object group 116 to the requesting client 100. The client's 100 receive notification that the backup object group has a data integrity error in response to the storage manager 112 sending the message of the data integrity error when it determines that the requested objects subject are not located in the network storage 106.

With the described embodiments of FIGS. 5, 6, 7, and 8, a block level interface may be used to store objects to allow for the archival of data sets in a manner previously used to backup data sets and volumes to sequential access media, such as tape, with a cloud based storage in which data may be stored in different types of storage media in the cloud storage. Further, the backup program may issue commands, such as a RESTORE command, typically used to retrieve data stored in a sequential manner from tape, from cloud based storage using a network protocol interface to transfer and return objects, such as HTTP.

In certain embodiments, the network storage 106 may be susceptible to files and objects being modified and deleted. Described embodiments provide techniques to validate backed-up data set objects to validate the data integrity of the data set objects in the network storage before returning data set objects to restore to the client systems. In this way, the client system are assured that the data sets that are restored comprise valid instance of the data sets that were initially backed-up in the network storage. This allows the use of cloud based storage services with backed-up data using common backup programs, such as those that use DUMP and RESTORE procedures, and other backup archival and restore procedures. Further, because cloud based storage systems may allow for the deletion or change of stored data, the data integrity operation ensures that a backup object group having a set of data sets backed-up remains valid in such a cloud based storage system susceptible to file change and deletion.

Cloud Computing Embodiments

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 9:
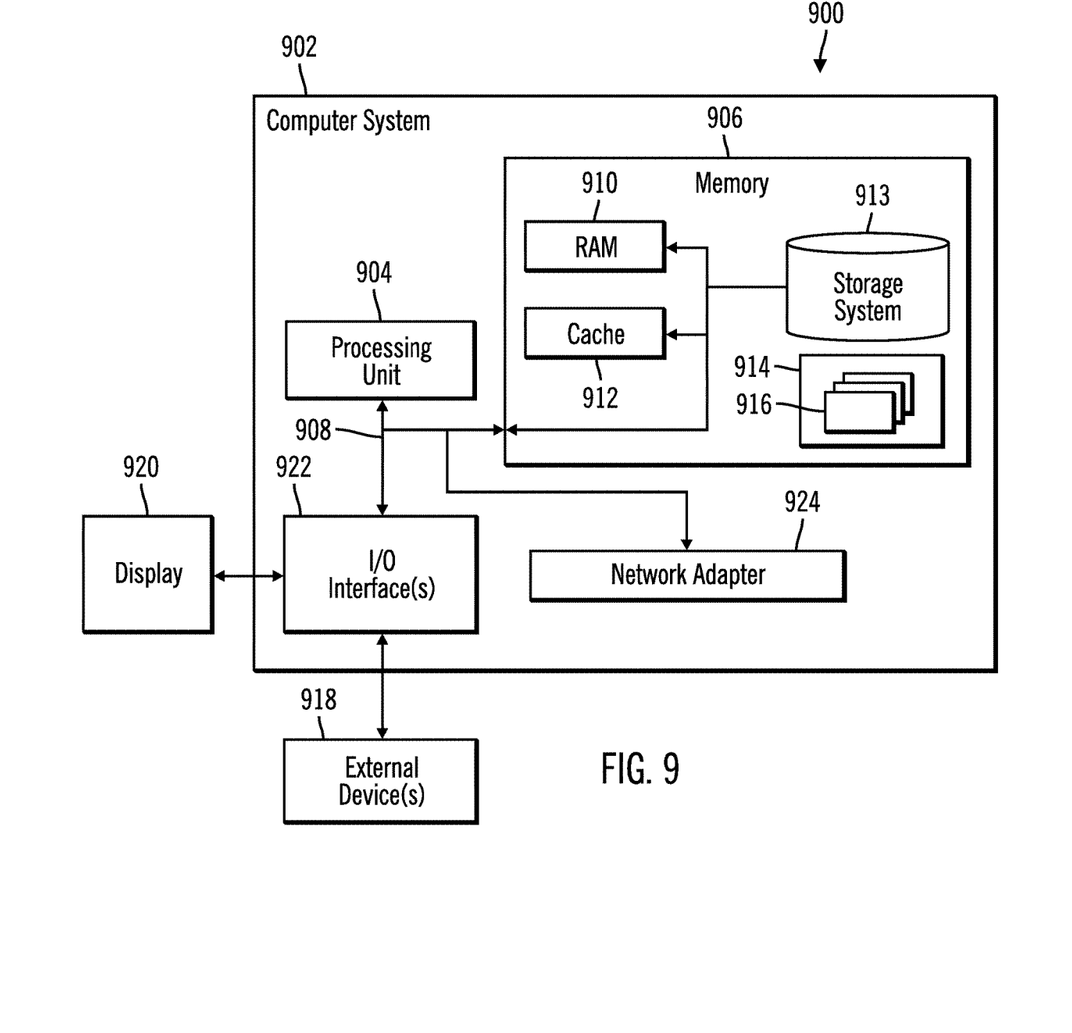
FIG. 9 depicts an embodiment of a cloud computing node.

Referring now to FIG. 9, a schematic of an example of a cloud computing node is shown, such as the client systems 100 and storage server 108, that implement a cloud based storage service. Cloud computing node 900 is only one example of a suitable cloud computing node and is not intended to suggest any limitation as to the scope of use or functionality of embodiments of the invention described herein. Regardless, cloud computing node 900 is capable of being implemented and/or performing any of the functionality set forth hereinabove.

In cloud computing node 900 there is a computer system/server 902, which is operational with numerous other general purpose or special purpose computing system environments or configurations. Examples of well-known computing systems, environments, and/or configurations that may be suitable for use with computer system/server 902 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 902 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 902 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, computer system/server 902 in cloud computing node 900 is shown in the form of a general-purpose computing device. The components of computer system/server 902 may include, but are not limited to, one or more processors or processing units 904, a system memory 906, and a bus 908 that couples various system components including system memory 906 to processor 904.

Bus 908 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 902 typically includes a variety of computer system readable media. Such media may be any available media that is accessible by computer system/server 902, and it includes both volatile and non-volatile media, removable and non-removable media.

System memory 906 can include computer system readable media in the form of volatile memory, such as random access memory (RAM) 910 and/or cache memory 912. Computer system/server 902 may further include other removable/non-removable, volatile/non-volatile computer system storage media. By way of example only, storage system 913 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 908 by one or more data media interfaces. As will be further depicted and described below, memory 906 may include at least one program product having a set (e.g., at least one) of program modules that are configured to carry out the functions of embodiments of the invention.

Program/utility 914, having a set (at least one) of program modules 916, may be stored in memory 906 by way of example, and not limitation, as well as an operating system, one or more application programs, other program modules, and program data. Each of the operating system, one or more application programs, other program modules, and program data or some combination thereof, may include an implementation of a networking environment. Program modules 916 generally carry out the functions and/or methodologies of embodiments of the invention as described herein.

Computer system/server 902 may also communicate with one or more external devices 918 such as a keyboard, a pointing device, a display 920, etc.; one or more devices that enable a user to interact with computer system/server 902; and/or any devices (e.g., network card, modem, etc.) that enable computer system/server 902 to communicate with one or more other computing devices. Such communication can occur via Input/Output (I/O) interfaces 922. Still yet, computer system/server 902 can communicate with one or more networks such as a local area network (LAN), a general wide area network (WAN), and/or a public network (e.g., the Internet) via network adapter 20. As depicted, network adapter 924 communicates with the other components of computer system/server 902 via bus 908. It should be understood that although not shown, other hardware and/or software components could be used in conjunction with computer system/server 902. Examples, include, but are not limited to: microcode, device drivers, redundant processing units, external disk drive arrays, RAID systems, tape drives, and data archival storage systems, etc.

Figure 10:
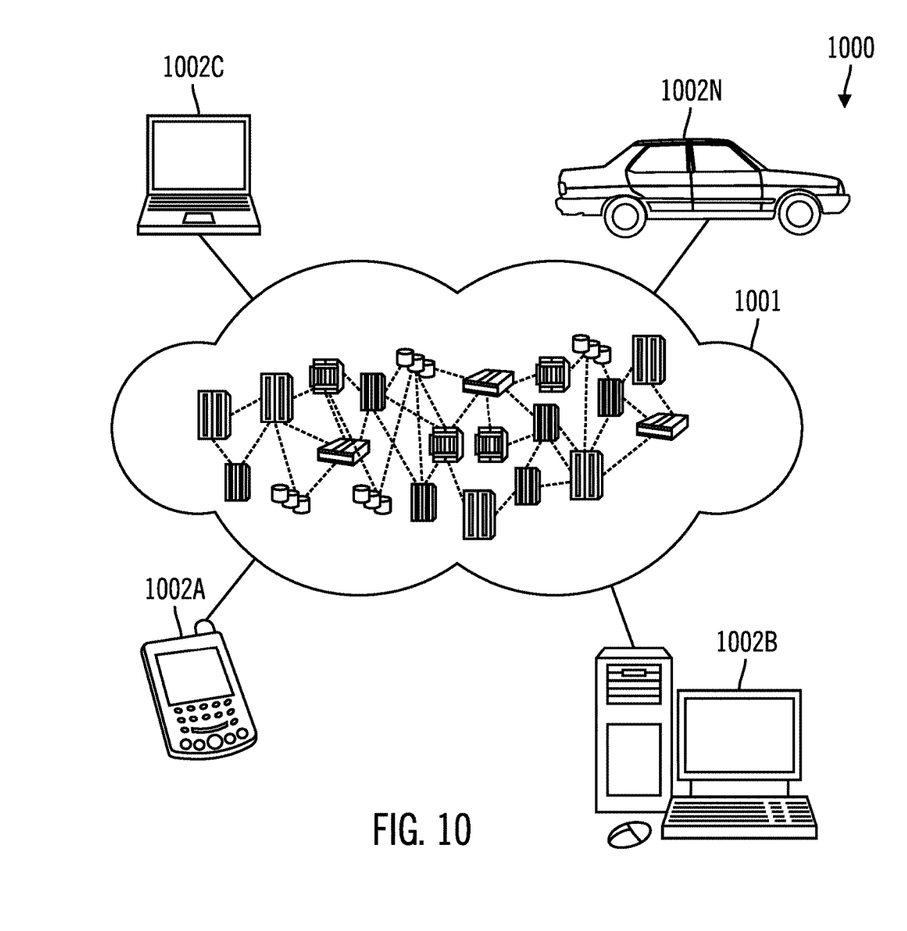
FIG. 10 depicts an embodiment of a cloud computing environment.

Referring now to FIG. 10, illustrative cloud computing environment 1000 is depicted. As shown, cloud computing environment 1000 comprises one or more cloud computing nodes 1001 with which local computing devices used by cloud consumers, such as, for example, personal digital assistant (PDA) or cellular telephone 1002A, desktop computer 1002B, laptop computer 1002C, and/or automobile computer system 1002N may communicate. Nodes 1001 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1002A-N shown in FIG. 10 are intended to be illustrative only and that computing nodes 1001 and cloud computing environment 1000 can communicate with any type of computerized device over any type of network and/or network addressable connection (e.g., using a web browser).

Figure 11:
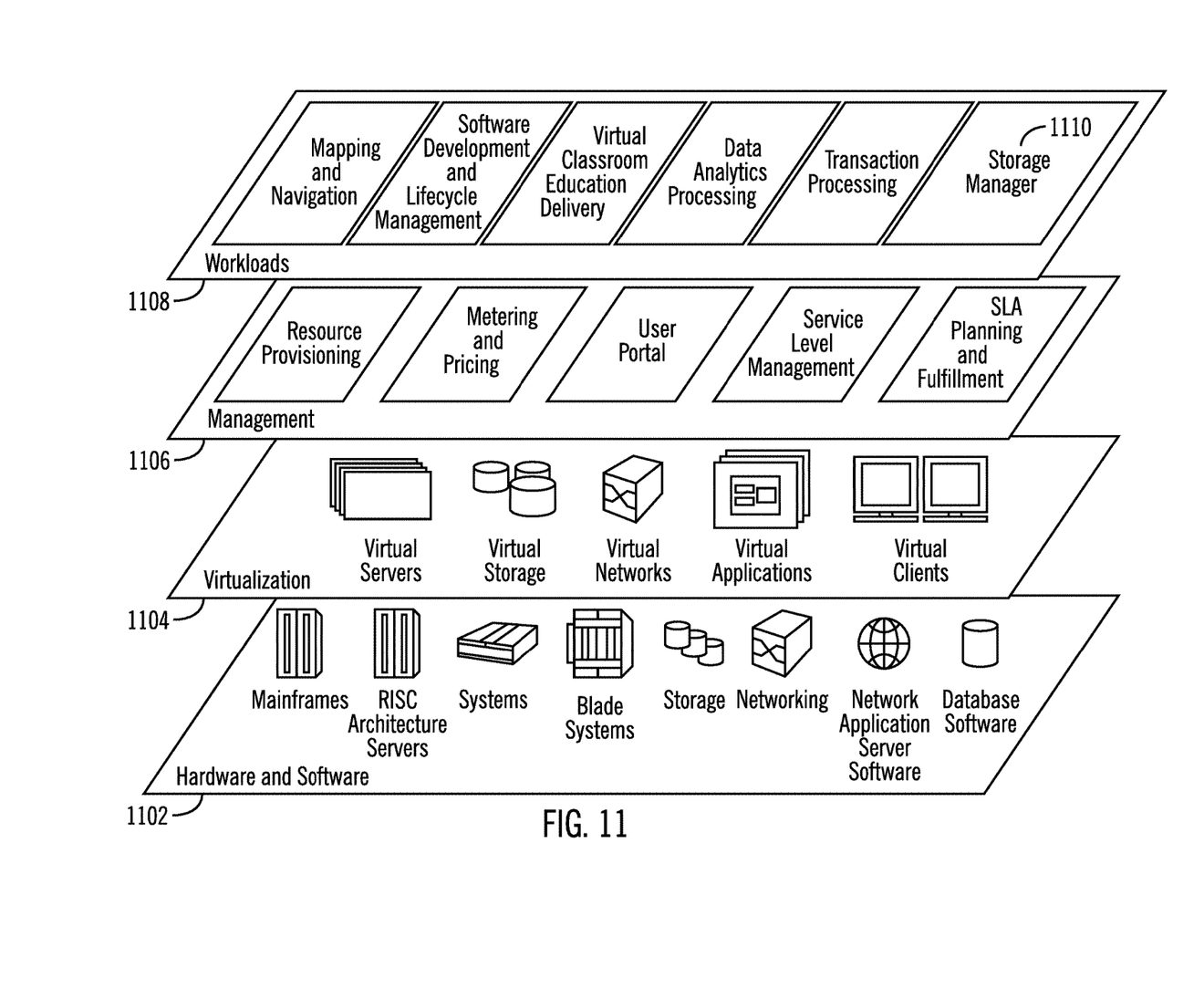
FIG. 11 depicts an embodiment of abstraction model layers of a cloud computing environment.

Referring now to FIG. 11, a set of functional abstraction layers provided by cloud computing environment 1000 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 1102 includes hardware and software components. Examples of hardware components include: mainframes; RISC (Reduced Instruction Set Computer) architecture based servers; storage devices; networks and networking components. In some embodiments, software components include network application server software.

Virtualization layer 1104 provides an abstraction layer from which the following examples of virtual entities may be provided: virtual servers; virtual storage; virtual networks, including virtual private networks; virtual applications and operating systems; and virtual clients.

In one example, management layer 1106 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 1108 provides examples of functionality for which the cloud computing environment may be utilized. Examples of workloads and functions which may be provided from this layer include: mapping and navigation; software development and lifecycle management; virtual classroom education delivery; data analytics processing; transaction processing; and cloud based storage manager services 1110 as described above with respect to the storage server 108 and storage manager 122 described above.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The reference characters used herein, such as a, b, i, n are used herein to denote a variable number of instances of an element, which may represent the same or different values, and may represent the same or different value when used with different or the same elements in different described instances.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product to backup data sets to a network storage over a network, wherein the computer program product comprises a computer readable storage medium having computer readable program instructions executed by a processor to perform operations, the operations comprising:
    generating data set objects including data sets at a client storage;
    generating an inventory object having information on each of the data set objects, wherein the data set objects and the inventory object are part of a backup object group to backup to the network storage;
    transferring the data set objects and the inventory object in the backup object group to the network storage, wherein the data set objects are transferred in an order of the data set objects indicated in the inventory object, to store using a block level interface to perform a block level storage transfer to transfer blocks of the data objects to write to a sequential file to store sequentially in the sequential file in the order indicated in the inventory object, wherein the data set objects are written sequentially to the sequential file in a sequential manner used for transferring data to sequential access media, wherein the data set objects are stored in non-sequential access storage in the network storage;
    retrieving the inventory object from the network storage to select at least one of the data set objects in the network storage;
    requesting at least one data set object indicated in the retrieved inventory object; and
    receiving from the network storage the requested at least one data set object transferred using the block level storage transfer, to retrieve data stored in the sequential manner in the sequential file in the network storage, in response to the requested at least one data set object located in the network storage.

2. The computer program product of claim 1, wherein the operations further comprise:
    issuing a GET command to perform the retrieving of the inventory object from the network storage, wherein the retrieved inventory object is processed to determine the data set objects in the network storage; and
    issuing a GET command to perform the requesting of the at least one of the data set objects.

3. The computer program product of claim 2, wherein the operations further comprise:
    issuing PUT commands to perform the transferring of the data set objects and the inventory object to the network storage for storage.

4. The computer program product of claim 3, wherein the PUT and GET commands comprise Hypertext Transport Protocol ("HTTP") PUT and GET commands.

5. The computer program product of claim 3, wherein the transferring the data set objects further comprises initiating a DUMP command to copy the data sets to objects in the network storage, wherein the DUMP command initiates the PUT command to perform the transferring of the data sets that are indicated in the DUMP command, and wherein the requesting the at least one data set object in the network storage comprises issuing a RESTORE command to restore at least one of the data sets in the objects from the network, wherein the RESTORE command initiates the GET command to retrieve at least one of the objects having the data sets to restore.

6. The computer program product of claim 1, wherein the operations further comprise:
    receiving notification that the backup object group has a data integrity error in response to at least one calculated identifier code of the at least one of the data set objects subject to the requesting does not match at least one identifier code stored for the at least one of the data set objects stored in the network storage, wherein the requested at least one data set object is received from the network storage using the block level storage transfer in response to the requested at least one data set object located in the network storage and the at least one calculated identifier code matching the at least one identifier code stored for the at least one of the data set objects.

7. The computer program product of claim 1, wherein the operations further comprise:
    receiving notification that the backup object group has a data integrity error in response to the at least one of the data set objects subject to the requesting is not located in the network storage.

8. A computer program product to backup data sets in a network storage that are received from a plurality of client systems over a network, wherein the computer program product comprises a computer readable storage medium having computer readable program instructions executed by a processor to perform operations, the operations comprising:
    receiving, from the plurality of client systems over the network, data set objects and inventory objects, wherein each inventory object has information on each of the data set objects in a backup object group, wherein the client systems transfer the data set objects and the inventory objects, in an order of the data set objects indicated in the inventory object, using a block level interface to perform a block level storage transfer to transfer blocks to a sequential file to store sequentially in the sequential file in the order indicated in the inventory object, wherein the data set objects are written sequentially to the sequential file in a sequential manner used for transferring data to sequential access media;
    storing the received data set objects in the network storage, wherein the data set objects are stored to non-sequential access storage in the network storage;
    indicating the stored data set objects in an inventory object;
    receiving a request for a data set object comprising one of the data set objects from a client system of the client systems;
    determining from the inventory object whether the requested data set object is indicated in the inventory object for the backup object group is stored in the network storage; and returning from the network storage the requested data set object to the client system using the block level storage transfer, to retrieve data stored in the sequential manner in the sequential file in the network storage, in response to the requested data set object located in the network storage.

9. The computer program product of claim 8, wherein the inventory object is read-only and cannot be modified, wherein the determining that the requested data set object indicated in the inventory object is stored in the network storage comprises:

generating a data integrity error for the backup object group including the requested data set object in response to determining at least one that the requested data set object is not located in the network storage and a data integrity error with the data set objects stored in the network storage; and returning a message with indication of the data integrity error to the client system requesting the data set object in response to generating the data integrity error.

10. The computer program product of claim 8, wherein the network storage comprises a cloud based storage service for the client systems to backup object groups at the network storage.

11. The computer program product of claim 8, wherein the operations further comprise:

generating a data integrity error in response to determining that a calculated identifier code of the requested data set object does not match an identifier code stored for the requested data set object, wherein the requested data set object is returned to the client system in response to calculated identifier code matching the identifier code stored for the requested data set object.

12. A system coupled to a network storage and a plurality of client systems over a network, comprising:

a processor;

a computer readable storage medium including computer readable program instructions that when executed by a processor causes operations, the operations comprising:

receiving, from the plurality of client systems over the network, data set objects and inventory objects, wherein each inventory object has information on each of the data set objects in a backup object group, wherein the client systems transfer the data set objects and the inventory objects, in an order of the data set objects indicated in the inventory object, using a block level interface to perform a block level storage transfer to transfer blocks to a sequential file to store sequentially in the sequential file in the order indicated in the inventory object, wherein the data set objects are written sequentially to the sequential file in a sequential manner used for transferring data to sequential access media;

storing the received data set objects in the network storage, wherein the data set objects are stored to non-sequential access storage in the network storage;

indicating the stored data set objects in an inventory object;

receiving a request for a data set object comprising one of the data set objects from a client system of the client systems;

determining from the inventory object whether the requested data set object is indicated in the inventory object for the backup object group is stored in the network storage; and returning from the network storage the requested data set object to the client system using the block level storage transfer, to retrieve data stored in the sequential manner in the sequential file in the network storage, in response to the requested data set object located in the network storage.

13. The system of claim 12, wherein the inventory object is read-only and cannot be modified, wherein the determining that the requested data set object indicated in the inventory object is not stored in the network storage comprises;

generating a data integrity error for the backup object group including the requested data set object in response to determining at least one that the requested data set object is not located in the network storage and a data integrity error with the data set objects stored in the network storage; and returning a message with indication of the data integrity error to the client system requesting the data set object in response to generating the data integrity error.

14. The system of claim 12, wherein the network storage comprises a cloud based storage service for the client systems to backup object groups at the network storage.

15. The system of claim 12, wherein the operations further comprise:

generating a data integrity error in response to determining that a calculated identifier code of the requested data set object does not match an identifier code stored for the requested data set object, wherein the requested data set object is returned to the client system in response to calculated identifier code matching the identifier code stored for the requested data set object.

16. A method implemented in a computer system to backup data sets to a network storage over a network, comprising:

generating data set objects including data sets at a client storage;

generating an inventory object having information on each of the data set objects, wherein the data set objects and the inventory object are part of a backup object group to backup to the network storage;

transferring the data set objects and the inventory object in the backup object group to the network storage, wherein the data set objects are transferred in an order of the data set objects indicated in the inventory object, to store using a block level interface to perform a block level storage transfer to transfer blocks of the data objects to write to a sequential file to store sequentially in the sequential file in the order indicated in the inventory object, wherein the data set objects are written sequentially to the sequential file in a sequential manner used for transferring data to sequential access media, wherein the data set objects are stored in non-sequential access storage in the network storage;

retrieving the inventory object from the network storage to select at least one of the data set objects in the network storage;

requesting at least one data set object indicated in the retrieved inventory object; and receiving from the network storage the requested at least one data set object transferred using the block level storage transfer, to retrieve data stored in the sequential manner in the sequential file in the network storage, in response to the requested at least one data set object located in the network storage.

17. The method of claim 16, further comprising:
issuing a GET command to perform the retrieving of the inventory object from the network storage, wherein the retrieved inventory object is processed to determine the data set objects in the network storage; and
issuing a GET command to perform the requesting of the at least one of the data set objects.

18. The method of claim 17, further comprising:
issuing PUT commands to perform the transferring of the data set objects and the inventory object to the network storage for storage.

19. The method of claim 18, wherein the transferring the data set objects further comprises initiating a DUMP command to copy the data sets to objects in the network storage, wherein the DUMP command initiates the PUT command to perform the transferring of the data sets that are indicated in the DUMP command, and wherein the requesting the at least one data set object in the network storage comprises issuing a RESTORE command to restore at least one of the data sets in the objects from the network, wherein the RESTORE command initiates the GET command to retrieve at least one of the objects having the data sets to restore.

20. The method of claim 16, further comprising:
receiving notification that the backup object group has a data integrity error in response to at least one calculated identifier code of the at least one of the data set objects subject to the requesting does not match at least one identifier code stored for the at least one of the data set objects stored in the network storage, wherein the requested at least one data set object is received from the network storage using the block level storage transfer in response to the requested at least one data set object located in the network storage and the at least one calculated identifier code matching the at least one identifier code stored for the at least one of the data set objects.

21. The method of claim 16, further comprising:
receiving notification that the backup object group has a data integrity error in response to the at least one of the data set objects subject to the requesting is not located in the network storage.

22. A method implemented in a computer system to backup data sets in a network storage that are received from a plurality of client systems over a network, comprising:
receiving, from the plurality of client systems over the network, data set objects and inventory objects, wherein each inventory object has information on each of the data set objects in a backup object group, wherein the client systems transfer the data set objects and the inventory objects, in an order of the data set objects indicated in the inventory object, using a block level interface to perform a block level storage transfer to transfer blocks to a sequential file to store sequentially in the sequential file in the order indicated in the inventory object, wherein the data set objects are written sequentially to the sequential file in a sequential manner used for transferring data to sequential access media;
storing the received data set objects in the network storage, wherein the data set objects are stored to non-sequential access storage in the network storage;
indicating the stored data set objects in an inventory object;
receiving a request for a data set object comprising one of the data set objects from a client system of the client systems;
determining from the inventory object whether the requested data set object is indicated in the inventory object for the backup object group is stored in the network storage;
and
returning from the network storage the requested data set object to the client system using the block level storage transfer, to retrieve data stored in the sequential manner in the sequential file in the network storage, in response to the requested data set object located in the network storage.

23. The method of claim 22, wherein the inventory object is read-only and cannot be modified, wherein the determining that the requested data set object indicated in the inventory object is stored in the network storage comprises:
generating a data integrity error for the backup object group including the requested data set object in response to determining at least one that the requested data set object is not located in the network storage and a data integrity error with the data set objects stored in the network storage; and
returning a message with indication of the data integrity error to the client system requesting the data set object in response to generating the data integrity error.

24. The method of claim 22, wherein the network storage comprises a cloud based storage service for the client systems to backup object groups at the network storage.

* * * * *